R. S. GEHR.
PLANTER.
APPLICATION FILED APR. 2, 1919.
1,400,740.
Patented Dec. 20, 1921.
3 SHEETS—SHEET 1.
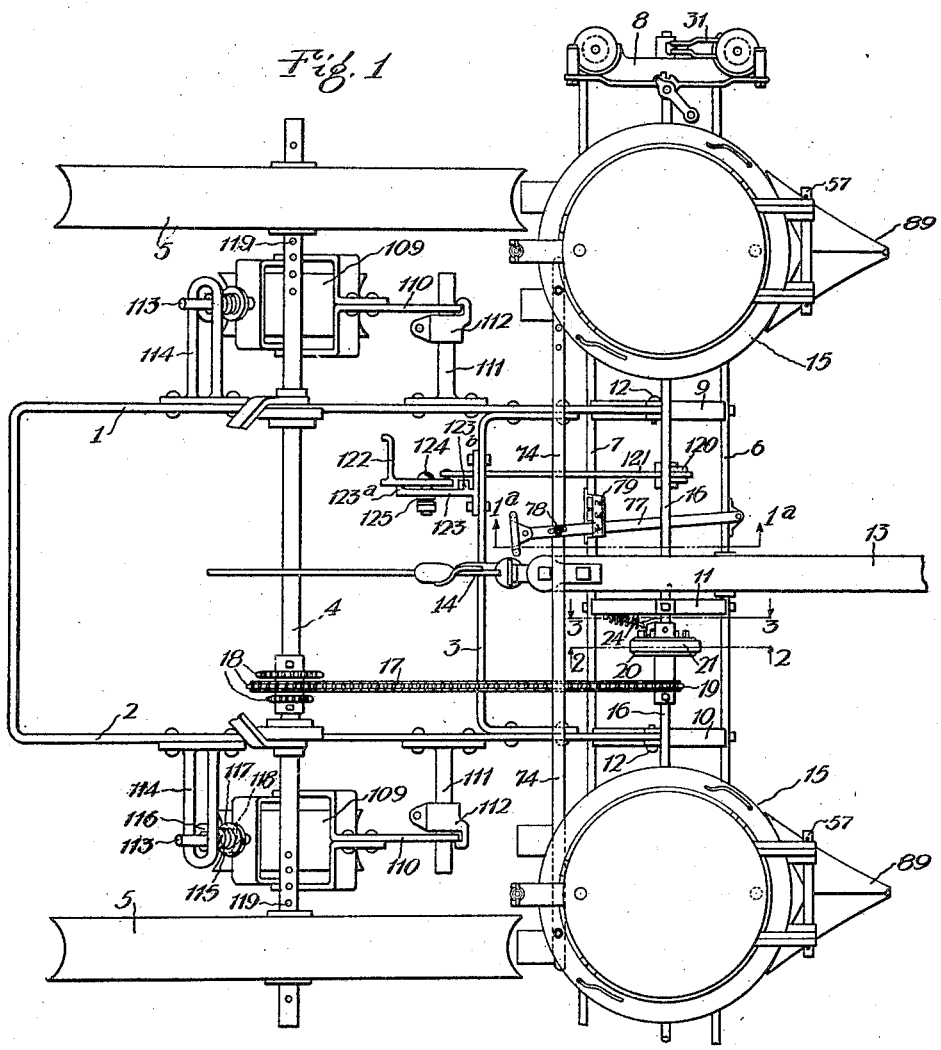
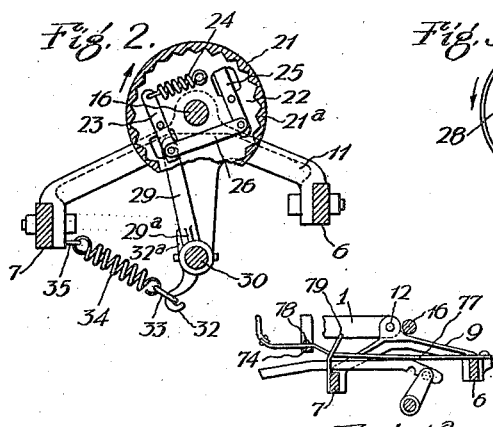
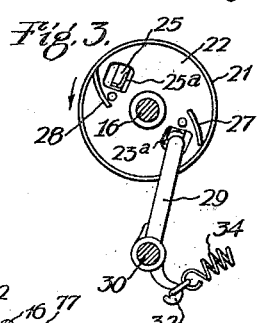
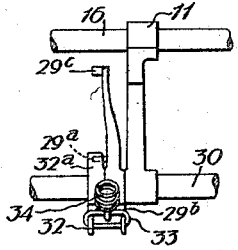
Ray Stewart Gehr
Inventor R. S. GEHR.
PLANTER.
APPLICATION FILED APR. 2, 1919.
1,400,740.
Patented Dec. 20, 1921.
3 SHEETS—SHEET 2.
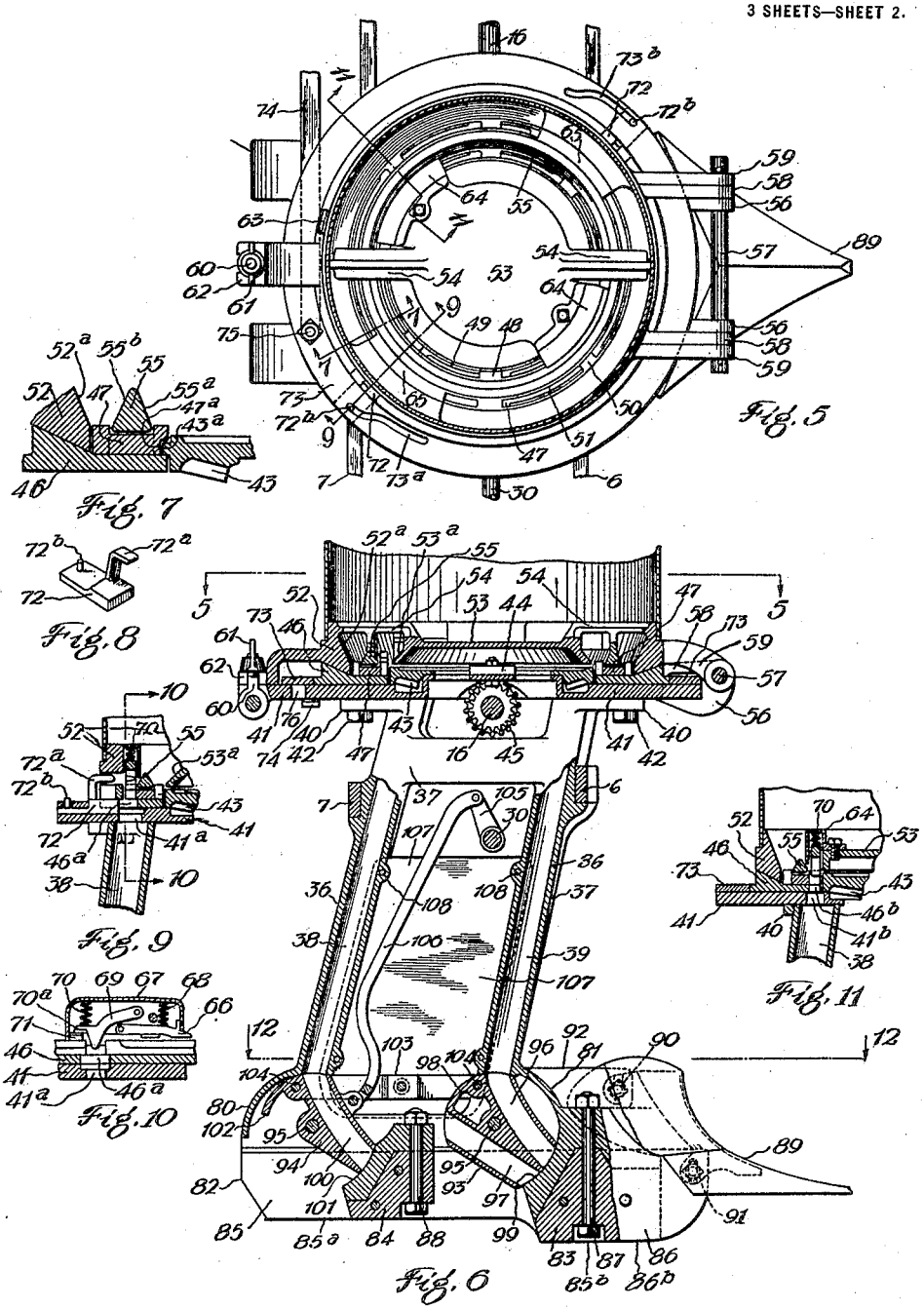

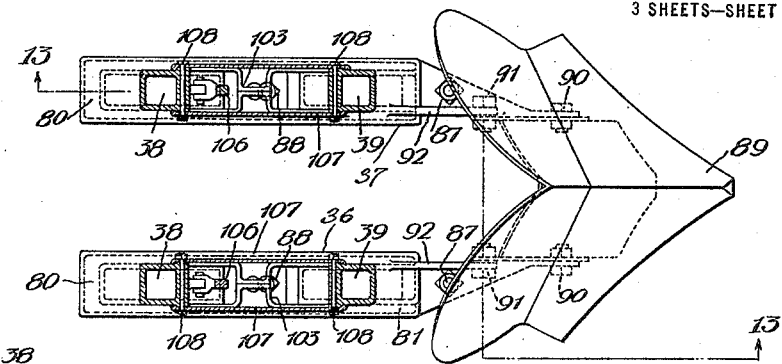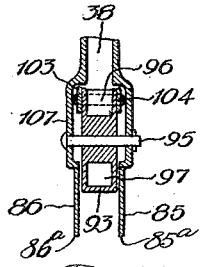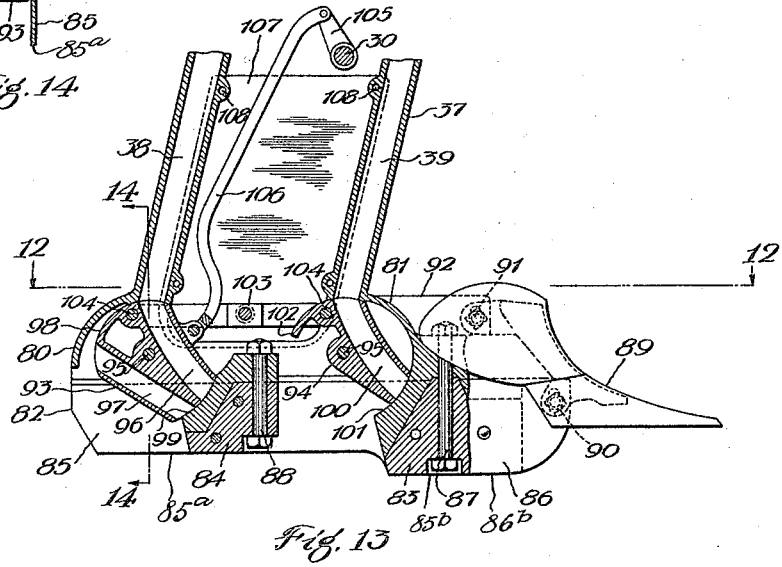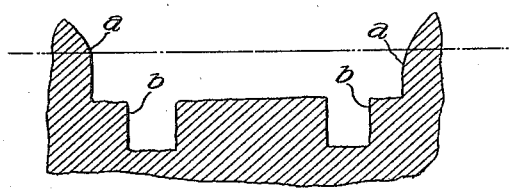

UNITED STATES PATENT OFFICE.

RAY STEWART GEHR, OF CLEVELAND, OHIO.

PLANTER.

1,400,740.             Specification of Letters Patent.       Patented Dec. 20, 1921.

Original application filed November 9, 1918, Serial No. 261,794. Divided and this application filed April 2, 1919. Serial No. 286,831.

*To all whom it may concern:*

Be it known that I, RAY STEWART GEHR, a citizen of the United States, residing at Cleveland, county of Cuyahoga, State of Ohio, have invented certain new and useful Improvements in Planters, of which the following is a specification, reference being had therein to the accompanying drawings.

The invention relates to methods of and machines for planting corn and especially to mechanism adapted to plant the seeds in such a manner as to increase the yield per acre and reduce the cost, especially the labor cost, of producing corn.

It is well understood that in hill planting as now practised the individual plants, by reason of the close bunching of the seeds in the hill, have unfavorable conditions for growth both in the ground and above it. My invention contemplates hill planting in which the kernels of each hill are deposited in a definite spaced relation to each other, and one object of the invention is the provision of a practical and efficient mechanism for separating the individual seeds from the mass in a container and delivering them at the separated points of discharge. Another object of the invention is the provision of improved dropping valve mechanism adapted for use in spaced kernal check row planting.

Another object of my invention is the provision, in a machine such as referred to above, of means by which the driver can readily vary the number of seeds deposited in each hill.

My invention also contemplates a more effective method of drilling, namely, drilling in, what I term, double rows. In these "double" rows the seeds are deposited along two parallel lines spaced from each other far enough, say five to seven inches, so that the plants of one line will not interfere with the development of those of the other line, while, at the same time, the two lines of plants can be cultivated, and otherwise treated, as one row. Accordingly, one of the objects of my invention is the provision of a machine for drilling the seeds in such "double" rows. Another object of the invention is the provision of a machine adapted to perform the above described spaced kernel hill planting and having means by which it can readily be converted or adapted for "double" row drilling.

Another object of the invention is the provision of an improved method of spaced kernel check-rowing and double row drilling and of improved furrow forming devices for use in carrying out said method.

A further object of the invention is the provision in a machine such as has been referred to of improved means for covering the seeds.

Other objects of my invention, relating more especially to various structural improvements, will appear in the following detailed description setting forth, in connection with the accompanying drawings, a preferred embodiment of my improvements.

The present application is a division of my pending application for planters, Serial No. 261,794, filed November 9, 1918.

In the drawings,

Figure 1 is a plan view of a planter embodying some of my improvements, parts of the machine being omitted or broken away to permit illustration as clear and on as large a scale as possible.

Fig. 1ª is a vertical section taken on the line 1ª—1ª of Fig. 1.

Fig. 2 is a vertical section taken on the line 2—2 of Fig. 1.

Fig. 3 is a vertical section on an enlarged scale taken on the line 3—3 of Fig. 1.

Fig. 4 is a detail view showing in front elevation the clutch control arm and some of the parts associated with it.

Fig. 5 is a plan view on an enlarged scale of one of the seed hoppers and associated parts of the machine, the top of the hopper being broken away to show the inner construction.

Fig. 6 is a vertical sectional view of the structure shown in Fig. 5, the section in the upper part of the view being taken through the center of the seed hopper and in the lower part of the view through the nearer of the furrow opening runners.

Fig. 7 is an enlarged fragmentary section on the line 7—7, Fig. 5.

Fig. 8 is a perspective detail view of one of the cut-off slides for throwing one of the discharge openings of the seed hopper out of action.

Fig. 9 is a fragmentary section on the line 9—9, Fig. 5.

Fig. 10 is a vertical section on the line 10—10, Fig. 9, showing one of the sets of cut-off and knock-out devices together with some of the associated parts.

Fig. 11 is a fragmentary section on the line 11—11, Fig. 5.

Fig. 12 is a horizontal section on the line 12—12, Fig. 6.

Fig. 13 is a vertical section on the broken line 13—13, Fig. 12.

Fig. 14 is a vertical section on the line 14—14, Fig. 13.

Fig. 15 is a transverse section through the furrow formed by the furrow opening devices shown in Figs. 5 to 14.

Referring in detail to the construction illustrated and, at the outset, more especially to Fig. 1, the machine has a main frame comprising side bars 1 and 2, which are united by a cross bar 3, and this frame is mounted upon an axle 4 having ground wheels 5, 5.

At the front of the main frame is disposed a transverse frame consisting of main bars 6 and 7 which are connected at their outside ends by check head castings 8, 8, the check head devices being broken away at the right side of the machine as shown in Fig. 1. The bars 6 and 7 are also rigidly connected by cross braces 9, 10 and 11. The front frame is pivotally connected to the front ends of the side bars 1 and 2 of the main frame by pins 12, 12, which pass through the front ends of the bars 1 and 2 and lugs or ears formed on the frame braces 9 and 10.

13 is a tongue suitably connected to the front frame. The front frame and the main frame are suitably connected by locking lever devices, designated as an entirety by 14, which are adapted to raise and lower the front frame so that the runners or other furrow opening devices carried thereby can be lifted free of the ground, or so that the furrow opening devices can be forced into the ground and there secured in operative position. It will be understood that a driver's seat is suitably supported on the main frame. The seat and lever mechanism, as well as other parts of a complete planter, are not shown in detail, or are wholly omitted for the reason that as to these features, any preferred forms of the well known construction may be employed.

On the front frame of the machine are mounted seed containers or hoppers and separating mechanisms 15, 15, which will presently be described in detail. 16 is a seeder operating shaft mounted in suitable bearings carried by the front frame; preferably one of the bearings is carried by the frame brace 11 while others, not shown, are carried by the hopper structures. The seeder operating shaft 16 is designed to be connected at its respective ends by suitable gearing to the rotary seed plates of the seed separating mechanism. The seeder shaft is driven from the axle 4 by a chain 17 which passes over any one of a series of various sized sprocket wheels 18 carried by said axle and over a sprocket wheel 19 which is rigidly connected to one element of a clutch mechanism 20. This clutch 20 is of the type having a continuously driven member which turns freely on the seeder shaft, a second member fast on the seeder shaft, and means controlled by check fork devices for intermittently connecting and disconnecting the two said members to cause an intermittent rotation of the seeder shaft. As shown, the clutch comprises a continuously rotating part 21 which turns freely on the seeder shaft and carries the sprocket wheel 19, and an intermittently moving part 22 which is fast on the seeder shaft. The part 22 carries a pawl 23 which tends normally to engage the internal teeth $21^a$ of the part 21 by reason of the action of the coil spring 24 which is connected at one end to the pawl 23 and at its other end to the clutch part 22. The pawl 23 carries on one side a dog $23^a$ which projects laterally through an aperture in the clutch part 22. 25 is a lever pivoted to the inner side of the clutch part 22 diametrically opposite the pawl 23 and similar to said pawl except that it is shorter and does not engage with the clutch teeth $21^a$. The lever 25 carries a dog $25^a$ which projects through a second aperture in the clutch part 22, and the pawl 23 and lever 25 are connected by link 26 which causes the parts 23 and 25 to move in unison. The clutch part 22 carries on its outer side laterally extending cam plates 27 and 28 which are disposed adjacent the dogs $23^a$ and $25^a$, respectively.

The clutch pawl is normally prevented from engaging the continuously rotating part 21 by an arm 29 which is mounted upon a rocker shaft 30 which carries at its extreme ends check forks 31. The arm 29 is loose on the shaft 30, being secured between the brace casting 11 and a downwardly extending arm 32 which is fast on the shaft 30. The arm 32 has an upwardly extending lug $32^a$ arranged to engage a laterally extending lug $29^a$ carried by the arm 29 to swing said arm rearwardly when one of the check forks is engaged by a tappet on the check wire. The arm 29 has a downward extension $29^b$, and this extension and the lower end of the arm 32 are connected by means of a plate 33 to the front end of a coil spring 32, the rear end of which is secured to a lug 35 on the frame brace 11. At its upper end the arm 29 carries a laterally extending roller $29^c$ which is designed to engage the clutch cams 27, 28, and the dogs $23^a$, $25^a$.

The spring 34 serves to normally hold the check fork on the shaft 30, and also the clutch arm 29, in their forward positions, the roller 29ᶜ being then in the path of the clutch cams and dogs so that one of the dogs is engaged by the roller 29ᶜ and the pawl 23 is held out of engagement with the continuously rotating clutch part 21. When one of the check forks is engaged by a tappet on the check wire, the lug 32ᵃ is moved rearwardly and carries the arm 29 rearward out of the path of the clutch cams and dogs. The pawl 23 of the clutch is then free to be swung by the spring 24 into engagement with the continuously rotating clutch part 21, and by reason of this clutch engagement, the seeder shaft 16 is caused to move with the clutch part 21. Immediately upon the release of the check fork from the wire tappet, the spring 34 swings the arms 29 and 32 forward again to their normal positions indicated in Figs. 2 and 3; and thereupon, as the clutch member 22 rotates, the next approaching cam engages the roller 29ᶜ of the clutch arm, forces it rearward and then permits it to be snapped quickly forward by the spring 34 against the adjacent clutch dog, causing a disengagement of the pawl 23. Thus, if the parts were in the positions indicated in Fig. 3 when the tappet engaged the check fork, the rearward movement of the arm 29 would permit the engagement of the clutch and the parts would turn in the direction of the arrow (Figs. 2 and 3); then the arm 29 having returned to its normal position, the cam 28 would engage the roller 29ᵃ as described and cause the latter to strike the dog 25ᵃ to cause the release of the clutch pawl and the stopping of the seeder shaft 16. As the cam 27 and the dog 23ᵃ are diametrically opposite the cam 28 and dog 25ᵃ, each actuation of the check fork and corresponding engagement of the clutch causes a half revolution of the seeder shaft.

Referring now to the seed separating devices, it will be observed that the planter shown is of the two-row type, and inasmuch as the two seed separating and depositing mechanisms are, in essential respects, duplicates of each other, a description of one will suffice.

36 and 37 are seed tube castings rigidly bolted to the frame bars 6 and 7 in any suitable or well known manner, for example, as shown in my last mentioned pending application. Each of the seed tube castings comprises a pair of downwardly and rearwardly inclined conduits 38 and 39 which are formed at their upper ends with lugs 40 and on the upper ends of the two castings is mounted the hopper and seed separating mechanism 15.

In my pending application, Serial No. 575,156, filed August 2, 1910, I present a machine designed to carry out spaced kernel hill planting and double row drilling; and in the machine shown in the said application the seed container is provided with four discharge openings for the seeds and there are four separate ducts to conduct the seeds downward to the ground. Since a certain minimum circumferential space is necessarily occupied by the cut-off devices at each discharge opening, it is difficult, where four openings are provided, to secure sufficient circumferential space for the filling of the seed cells of the seed plate without undesirably enlarging the diameter of the seed container and the seed plate. In my pending application referred to I have sought to overcome this difficulty as far as possible by providing a special form of cut-off and knock-out device which is exceedingly compact circumferentially. In my pending application Serial No. 261,794, of which this application is a division, the difficulty referred to is overcome by providing a smaller number of discharge openings for the seed container, preferably two, and, in connection with the discharge openings, means for distributing the individual seeds discharged first to one and then to another of a plurality of ducts which conduct the seeds downward to the ground.

In the present construction, however, the difficulty in question is overcome in still another way, namely, by providing a seed plate with two separate series of seed cells, the two series preferably being circular and concentric, and by providing the hopper with two discharge openings for each series, or four discharge openings in all, each of which is arranged to deliver into one of four seed ducts for conducting the seeds downward to the ground. Preferably the discharge openings of each pair are arranged diametrically opposite each other and the openings of one pair are set ninety degrees from the openings of the other pair. With this form of seed separating and discharging mechanism ample filling space for the seed cells is secured without undue enlargement of the hopper mechanism.

The seed separating mechanism is mounted on a base plate 41 which is secured by bolts 42 to the lugs 40 of the seed tube castings. On the inner part of this base plate is rotatably supported an annular bevel gear 43 which is operatively secured in position by one or more clips 44 bolted to the base plate 41. 45 is a bevel pinion fast on the seeder shaft 16 and arranged to mesh with and drive the gear 43. An annular plate or ring 46 is mounted upon the base plate 41 and on said ring 46 is mounted in turn a seed plate 47 of peculiar construction. This seed plate is provided on its inner edge with one or more notches 47ᵃ adapted to be engaged by a lug 48ᵃ on the gear 43 so that the seed plate will be driven by the gear. At its inner side the seed plate 47 is formed with a circular series of individual edge selection seed cells 48 preferably separated by upstanding lugs or teeth 49. Similarly, on its outer side, the seed plate is formed with a series of seed cells 50 separated by upstanding teeth 51, the outer series of seed cells being concentric with the inner series of cells.

The hopper bottom comprises an outer ring part 52 which rests upon the ring 46, a raised or crowned center part 53 joined to the ring 52 by bridge members 54, a ring 55 disposed between the ring 52 and center part 53 of the bottom and connected to the bridge members 54 as indicated in Fig. 6. The parts of the bottom are preferably cast integral as shown. The ring part 55 is triangular in cross section and overlies the middle part of the annular seed plate while the concentric channels formed between said ring 55 and the center part 53 and the ring 55 and the outer ring part 52, respectively, register with the inner and outer series of cells of the seed plate. On reference to Fig. 6, it will be noted that the outer inclined surface 53ª of the center part of the hopper bottom coöperates with the inclined inner surface 55ª of the ring 55 to form a downwardly converging annular channel leading to the inner series of cells 48 of the seed plate, while the inclined wall 52ª of the ring 52 similarly coöperates with the outer inclined wall 55ᵇ of the ring 55 to form an annular channel leading to the outer series of cells 50 of the seed plate.

The ring 46 and the hopper bottom are pivotally mounted on the base 41, the latter being formed with arms 56, in which is mounted a pivot pin 57, and the ring 46 having arms 58 and the hopper bottom having arms 59 which are mounted on said pin. At its rear side the base 41 carries a swinging bolt 60 with a thumb nut 61 which is adapted to engage a slotted lug 62 formed on the hopper bottom part 52. By loosening the thumb nut 61 and throwing its bolt out of engagement with the lug 62, the hopper bottom can be swung forward to uncover the seed plate and gear and their supporting parts, so that the seed plate can readily be removed when it is desired to substitute another one for it. Preferably the ring parts 46 and 52 are detachably connected by a spring clip 63, so that the ring 46 will normally be swung upward with the hopper bottom to prevent the spilling of seeds.

The hopper is provided with four discharge openings for seeds, two of said discharge openings being arranged diametrically opposite each other to register with the inner series of cells 48 of the seed plate, while the other two openings are arranged diametrically opposite each other, and ninety degrees from the first openings, to register with the outer series of cells 50 of the seed plate. The first mentioned pair of discharge openings are controlled by cut-off and knockout devices 64, 64 while the outer pair of discharge openings are controlled by substantially similar cut-off and knock-out devices 65, 65. The casting 36 has the upper end of its rear conduit 38 arranged to register with one of the outer discharge openings of the hopper while the upper end of its front conduit 39 registers with one of the inner discharge openings of the hopper. On the other hand, the casting 37 has the upper end of its rear conduit arranged to register with the other inner discharge opening of the hopper while the upper end of its front conduit registers with the other outer discharge opening of the hopper.

In Fig. 9 I have shown the construction of the parts at one of the outer discharge openings while in Fig. 11 I have shown the construction at one of the inner discharge openings. Except for the form of the casing, the cut-off and knock-out devices 64 are similar to cut-off and knock-out devices 65 and the description of one will suffice.

The cut-off device is in the form of a dog 66 pivotally mounted on the inclosing casing 67. The free end of the dog rides over the upper edges of the seed plate teeth and is pressed yieldingly downward by a spring 68. The knock-out device 69 is pivoted in a similar manner on the inclosing casing and is pressed downward at its free end by a spring 70. This knock-out device rides upon the upper edges of the seed plate teeth and drops into each seed cell as the latter passes under it in the usual manner for the purpose of insuring a proper discharge of the seed carried by the cell as the latter passes over the discharge opening. The knock-out is formed with a stop nose or lug 70ª adapted to engage a lug or projection 71 on the casing to limit the downward movement of the knock-out. The inclosing casing is secured to the ring 52, in the case of the outer discharge openings and to the center part 53 of the hopper bottom in the case of the inner discharge openings.

I provide means for rendering each of the outer discharge openings inoperative so that the other two discharge openings can be used for drilling purposes. Referring to Figs. 9 and 10 it will be observed that the ring 46, at the point of discharge, is formed with a slot 46ª through which the seed can pass to an aperture 41ª in the base plate, said aperture being arranged to register with one of the downward extending seed conduits. The base plate 41 is also formed adjacent to each of the outer discharge apertures with a radial slot which registers with the slot 46ª and is shaped to receive a flat slide or valve 72. These slides are normally in the position indicated in Fig. 9 with the discharge passage through the ring 46 and the base 41 open for the passage of seeds to the downwardly extending conduits. But by moving the slides radially inward the discharge passage can be closed so that seeds advanced by the seed plate to the point of discharge will pass smoothly over the slide and the discharge will not be effected. It is desirable in this latter case to render the knock-out device inoperative as otherwise it would strike the seed and possibly crack it. To this end the slide is formed with an upstanding finger 72$^a$ which has a beveled end adapted to engage the beveled lower side of the stop nose 70$^a$ of the knock-out so as to raise the latter and hold it in an inoperative position.

The slides 72 may be actuated and secured in one position or another in any desirable manner. I have shown a construction similar to that disclosed in my co-pending application Serial No. 575,156 which provides for the actuation of the slides from the driver's seat. That is, each slide is provided with an upstanding lug or pin 72$^b$ which coöperates with a cam ring 73 slidably supported upon the base casting 41. This ring is formed with cam slots 73$^a$ and 73$^b$ into which the pins 72$^b$ of the respective slides extend. The forms of the cam slots are such that one of the slides can be moved inward to operative position by partially turning the cam ring, while a further movement will close the other slide.

To facilitate movement of the cam rings 73 of the two hoppers, a bar or link 74 is arranged to connect the two rings, the connection in the case of each ring being affected by a bolt 75 which passes through a slot 76 in the hopper base 41. 77 is a foot lever pivoted at its front end on the frame bar 6, and having a pin and slot connection at 78 with the link 74. The foot lever engages a bracket 79 on the frame bar 7, which bracket is provided with three notches to receive the foot lever and hold it in any one of the three positions corresponding to the three possible positions of the cam rings 73. The numerals "2," "3," "4" are displayed on the bracket 79 above the several notches and indicate the positions of the foot lever to secure the dropping of two, three or four seeds, respectively, in a hill. The foot lever is also set at "2" for double row drilling.

As indicated in Fig. 11, the ring 46 and the base plate 41 are formed with registering apertures 46$^b$ and 41$^b$, respectively, for the discharge of seeds from the inner series of cells 48 of the seed plate.

Each of the seed tube castings 36 and 37 is formed at its lower end with valve casings 80 and 81, and to the lower end of the said castings 36 and 37 is secured a runner 82. Each of these runners comprises frame castings 83 and 84 and wrought side plates 85 and 86 which are riveted to the castings 83 and 84 and are united at their front ends to form a sharp, soil opening blade. As shown in Figs. 6 and 13 the castings 36 and 37 extend downward between the runner plates 85, 86 and are shaped to receive the frame castings 83, 84 of the runners. Bolts 87 and 88 serve to draw the castings 83, 84 into tight interlocking engagement with the seed tube castings and constitute secure but readily detachable fasteners for the runners.

It will be noted on reference to Figs. 6 and 13, that the parallel side plates 85 and 86 of the runners are recessed or cut away at their lower sides from points directly beneath the front dropping valves to their rear ends, thus forming horizontal bottom edges 85$^a$, 86$^a$ materially above the horizontal bottom edges 85$^b$, 86$^b$ at the front end of the runner. The purpose of this construction will later be explained.

Directly in front of the two runners is arranged a sweep or plow 89 which is secured by bolts 90 and 91 to the front ends of the runners and to lugs 92, respectively, said lugs, in the construction shown, being formed integral with the seed tube castings. The plow is arranged with its bottom edge somewhat above the bottom of the runners. Consequently, when the furrow forming devices are set at proper depth the plow serves to sweep out a shallow, wide furrow $a$ while the runners, following after, form two parallel narrow furrows $b$, $b$ in the bottom of the wide shallow furrow, as is shown in Fig. 15. The holes for the bolts 90, 91 are preferably elongated as indicated in Figs. 6 and 13 to provide for raising and lowering of the plow in relation to the runners.

At the lower ends of the front seed tube of the casting 36 and the rear seed tube of the casting 37 are arranged cylindrical dropping valves 93, while at the lower ends of the other two seed tubes are arranged dropping valves 94. Each of these four cylindrical dropping valves is mounted on a pivot pin 95 which passes through the side walls of its inclosing casing 80 or 81. Each of the valves 93 has seed passages 96, 97 which are separated at their upper ends by a cylindrical wall 98 which, like the passages 96 and 97, is designed to coöperate with the lower end of the seed tube above it and at its lower ends the passages are closely adjacent each other and are dsigned to coöperate with the seat or ledge 99.

Each of the valves 94 has a seed passage 100 designed to coöperate at its upper end with the lower end of the seed tube above it and at its lower end with a seat or ledge 101. This valve is also provided at its upper end with a cylindrical wall 102 which coöperates with the port at the lower end of the adjacent seed tube.

The two valves 93 and 94 of each seed tube casting are made to turn in unison by a forked link 103 which is pivotally connected to the valves by pins 104, as indicated in Figs. 6 and 14. To secure simultaneous operation of the four dropping valves the check fork rocker shaft 30 is provided with a pair of crank arms 105, 105 and each of these is connected by means of a link 106 to the rear valve in one of the seed tube castings, (see Figs. 6 and 13).

The passages 96 of the valves 93 and the passages 100 of the valve 94 are used in hill planting, while the passages 97 of the valves 93 are used for drilling. To permit the movement of the valves to the extreme positions necessary for drilling, the links 106 are peculiarly curved at their lower ends to prevent interference between them and the valves to which they are connected. The dropping valves and their connecting and actuating mechanism are protected from injury and accumulation of trash by cover plates 107, 107 which are secured to the outer and inner sides of each of the seed tube castings by means of bolts 108.

As the seeds are deposited both in hill planting and drilling in parallel adjacent furrows special means must be provided for covering the seeds. In the construction shown I provide the ground wheels 5, 5 with concave rims and set these wheels in line with the outer runners of the respective seed separating and dropping mechanisms, and thus provide for the covering of the seeds in the outside furrow of each row. To cover the seeds deposited in the inside furrow, I provide at each side of the machine a relatively small covering wheel 109 which is suitably mounted in the lower end of a forked drag bar 110 which has its upper end pivotally mounted on a bracket rod 111 carried by the adjacent side bar of the main frame of the machine, the upper end of the drag bar being secured in position by a clip 112 which is adjustable laterally inward and outward. The axle of each covering wheel 109 carries a forked thrust rod 113 which extends upward and rearward through a slotted bracket 114 which is bolted to the adjacent side bar of the main frame. Each thrust rod carries a coiled spring 115 which is interposed between washers 116, 117, the upper washer 116 abutting against the underside of the bracket 114 while the lower washer rests upon a nut 118 threaded upon the thrust rod to form adjustable abutments for the lower end of the spring.

It will be understood that each of the hopper and runner mechanisms is adjustable inward and outward on the front frame of the machine to vary the distance between the rows, such adjustment being permitted by the provision of a series of bolt holes in the frame bars 6 and 7 in the usual manner. To accommodate such adjustment the link 74 is provided at each end with a series of holes for the bolt 75 and the main axle 4 is provided at each end with a series of bolt holes 119 so that the covering wheels 5, 5 whose hubs are secured in position by the usual bolt fasteners, can be adjusted inward and outward. Similarly, adjustment of the small covering wheels 109, 109 is readily effected by adjusting the clips 112 inward or outward. The pressure of the small covering wheels upon the ground can readily be varied by adjusting the nuts 118 to increase or decrease the tension of the springs 115. This spring adjustment makes it possible to equalize the ground pressure of the main wheels 5, 5 and the small wheels 109, 109.

For controlling the clutch 20 and actuating the dropping valves independently of the check wire, I provide mechanism operable by the foot of the driver. 120 is a lever arm on the rocker shaft 30 and having its outer end connected by a link 121 to the lower end of a foot lever 122 which is mounted on a bracket 123 carried by the main frame bar 3. The lever 122 is loosely supported on a pivot bolt 124 and a spring 125 is interposed between the bracket 123 and the nut of the bolt 124 so that the foot lever can be rocked laterally somewhat if the tension of the spring is overcome. The bracket 123 is formed with stop lugs 123$^a$ and 123$^b$ with which the foot lever coöperates.

When the foot lever is used for hill dropping, it swings between the two stop lugs 123$^a$ and 123$^b$; and when it is desired to use the machine for drilling, the foot lever 77 having been moved to notch "2" to close two of the four hopper discharge openings, the foot lever 122 is thrust forward and pressed laterally to enable it to pass the front stop 123$^b$ which secures it in its forward position. This movement of the foot lever moves the dropping valves 93 to their extreme positions with their passages 97 in register with their respective seed ducts 145 and 146 and, at the same time, the clutch controlling arm 29 is moved to and secured in its rear, inoperative position so that the seeder shaft 16 is continuously rotated.

In the operation of the planter, when used for hill planting, the actuation of the check fork rocker shaft, as the machine moves forward, throws the clutch mechanism into operation and causes a half revolution of the seeder shaft 16. The gear ratio of pinion 45 and gear 43 and the spacing of the seed cells in the seed plate are such that this half revolution of the seeder shaft causes one seed cell to pass over each of the four discharge apertures of the seed hopper so that four seeds are simultaneously discharged into the four seed conduits and find their way downward into the passage 96, 100 of the dropping valves 93, 94 and finally rest upon the ledges 99, 101. On the next actuation of the rocker shaft and seed shaft the four seeds in the dropping valves are simultaneously deposited upon the ground in the predetermined spaced relation to each other while another set of four seeds are delivered from the hopper into the upper ends of the seed conduits and in turn find their way downward into the dropping valves.

Should it be desired to plant less than four seeds in a hill, by moving foot lever 77 to notch "3," the cam rings 73 are caused to close one of the discharge apertures of each seed hopper and the number of seeds per hill is reduced to three and by moving the foot lever 77 to notch "2," a second discharge aperture in each hopper can be closed and the number of seeds per hill reduced to two.

In hill planting, as has been stated, four seeds are discharged from the seed hopper simultaneously and pass directly into the seed conduits leading to the dropping valves. For this reason upper valves directly beneath the hopper, are unnecessary. In this connection it is to be observed that the seed plate should be so related to the intermittent clutch mechanism through the driving mechanism that, on each operation of the clutch, the seed plate comes to rest with four seed cells immediately in front of their respective hopper discharge apertures so that, on the next operation of the clutch, the seeds in the four cells will be moved to discharge position near the beginning of the movement of the clutch and seed plate. This, as will readily be understood, insures the maximum amount of time for the passage of the seeds downward through the seed tubes to the dropping valves in the runners.

As has been explained the seed plates of the runners are recessed or cut away at their lower sides from points beneath the front dropping valve to their rear ends. The object of this is to prevent the inner side walls of the runners interfering with the seeds dropped by the front valves. Prior to my adoption of this expedient I found it difficult to secure an accurate positioning of the seeds and discovered that the seeds dropped by the front valves were not infrequenly dragged forward by engagement with the side walls of the advancing runner. By the use of the cut away form of construction the lower edges of the side walls of the runner below the front valves and at all points to the rear thereof are maintained well above the bottom of the furrow and interference with the seeds is consequently obviated. At the same time the side walls of the runner extend somewhat into the furrow and prevent the top soil falling into the furrow until the seeds have been deposited therein.

When it is desired to use this planter for drilling in double rows, it is only necessary to move foot lever 77 to notch "2" so as to turn the cam ring 73 and effect the closure of two of the discharge apertures of the seed hopper, and to secure the dropping valves in position with the passages 97 of the valves 93 alined with their coöperating seed conduits, whereupon as the machine advances the seeds are delivered through two of the discharge apertures of the seed hopper and find their way unimpeded through two open seed conduits and the passages of the valves 93 and are deposited one at a time in the two parallel furrows to form a double drilled row. The spacing of the seeds can be varied when drilling by substituting seed plates with a different number of seed cells and also by changing the speed ratio of the seeder shaft to the driving wheel axle.

I have stated above that the plow or sweep 89 of my improved furrow forming device is set to form a shallow, wide furrow; but it should be further explained that the primary object of the sweep is to render the soil between the two lines of seeds, and preferably also immediately outside said lines of seeds, entirely clear of vegetable growth, and especially weed growth, at the time the corn is planted so that the corn plants will be able to start their growth in advance of any weed growth in the row and thus greatly reduce the difficulty of keeping down weed growth during the development period of the corn. The expedient is valuable both in check-rowing and in drilling but especially so in drilling. It will, therefore, be understood that ordinarily the plow or sweep 89 should be set only deep enough to insure the sweeping out from the row of weed growth.

I am aware, of course, that it is common to drill corn in open furrows, as in listing and drilling, but as far as I am aware such prior practice and proposals have had to do only with planting in ordinary single rows. Obviously my improved method of planting in double rows in furrows formed of sufficient width to insure the elimination of weed growth between parallel lines of seeds at the time of planting has advantages which are peculiar to double row planting.

As it may be desirable to vary the depth of the narrow furrows $b$, $b$ somewhat I mount the plow 89 adjustably so that the user can, within limitation, determine the depth of the said narrow furrows.

While it is possible with the planter last described to vary the number of seeds dropped in each hill I do not advocate that practice except in the case of closely localized variations in the quality of the soil. Where the soil is fairly uniform it is preferable to plant four kernels to the hill, whether the soil be poor or good, and then adjust the number of seeds per acre to the quality of the soil by varying the distance between rows. With spaced kernel planting it is possible to do this because with the spacing of the kernels in the hill, normal development, both in the soil and above it, is insured for all four kernels, whereas, with bunched hill planting it is impossible to plant four kernels to the hill without having in numerous instances one plant surrounded and stunted by the other three.

It is, therefore, possible with spaced kernel hill planting to correspondingly reduce the number of rows and thus materially reduce the labor involved both in planting and cultivating. A reduction of the number of rows also has the advantage of opening the corn plants more to the action of the sun.

In the case of drilling, also, it is possible by my improved method of drilling in double rows to increase the number of seeds to the row, with spacing of seeds no closer than in single rows with a less number of seeds, and thereby reduce the number of rows and reduce the labor involved in planting and cultivating.

It will be understood that my various improvements can be embodied in various forms of construction other than those which have been illustrated for the purpose of explanation and that my invention is not limited to the forms of construction disclosed.

What I claim is:

1. In a seed planter, the combination of means for containing seeds in bulk provided with a plurality of discharge openings, means provided with a plurality of separate series of seed cells for selecting seeds from the mass in the containing means, the seed separating means being adapted to successively advance the cells of one series to a discharge opening and simultaneously to successively advance the cells of another series to another discharge opening, a plurality of downwardly extending conduits arranged to receive individual seeds from the said discharge openings and means arranged to receive the seeds from the said conduits and operable intermittently to simultaneously deposit on the ground a plurality of seeds in predetermined spaced relation to each other on two adjacent parallel lines.

2. In a seed planter, the combination of a single seed hopper provided with a plurality of discharge openings, means provided with a plurality of separate series of seed cells for selecting seeds from the mass in the containing means, the seed separating means being adapted to successively advance the cells of one series to a discharge opening and simultaneously to successively advance the cells of another series to another discharge opening, a plurality of downwardly extending conduits arranged to receive indivdual seeds from the said discharge openings, and means arranged to receive the seeds from the said conduits and operable intermittently to simultaneously deposit on the ground a plurality of seeds in predetermined spaced relation to each other on two adjacent parallel lines.

3. In a seed planter, the combination of a single seed hopper provided with a plurality of discharge openings, means provided with a plurality of separate series of seed cells for selecting seeds from the mass in the containing means, the seed separating means being adapted to successively advance the cells of one series to a discharge opening and simultaneously to successively advance the cells of another series to another discharge opening, and means comprising a plurality of conduits extending downward from the said discharge openings for depositing seeds on the ground in predetermined spaced relation to each other on two adjacent parallel lines.

4. In a seed planter, the combination of a seed hopper provided with four discharge openings, seed separating means in the bottom of the hopper provided with two concentric series of individual seed cells, the cells of one series being arranged to advance successively to two of the said discharge openings while the cells of the other series are simultaneously advanced to the other two discharge openings, four conduits leading downward from said discharge openings and means for receiving seeds from the lower ends of said conduits and operable intermittently to simultaneously deposit on the ground four seeds in predetermined spaced relation to each other on two adjacent parallel lines.

5. In a seed planter, the combination of a seed hopper formed with a plurality of discharge openings, means in the hopper for separating individual seeds from the mass and delivering them to the discharge openings, said means being provided with two concentric series of seed cells, the cells of one series being adapted to advance successively to one discharge opening while the cells of the other series are advancing to another discharge opening, a pair of furrow-opening runners below the seed hopper, a conduit extending downward from one of the hopper discharge openings to one of the runners and a separate conduit extending from another hopper opening downward to the other runner.

6. A runner for seed planters having in combination a furrow-opening front part, a pair of soil-engaging side walls extending rearwardly from said front part and a plurality of seed delivering means arranged tandem in the runner to deliver seeds downwardly between the side walls, the said side walls being substantially uniformly spaced apart and having their lower edges disposed far enough above the bottom of said furrow-opening part to prevent engagement of dropped seeds with said walls.

7. In a seed planter of the check-row type, the combination of a pair of furrow-opening runners arranged adjacent each other to plant in a double row, a pair of dropping valves associated with each runner and arranged in spaced tandem relation, said valves being adapted to positively discharge seeds downwardly and rearwardly on the ground with a force proportioned to the speed of travel of the planter, means for intermittently delivering a seed to each valve and means operable intermittently to simultaneously actuate the four valves to discharge four seeds in predetermined spaced relation on the ground.

8. In a seed planter of the check-row type, the combination of a pair of furrow-opening runners arranged adjacent each other to plant in a double row, a pair of pivotally mounted dropping valves associated with each runner in spaced tandem relation and connected to move in unison, said valves being adapted to positively discharge seeds downwardly and rearwardly on the ground with a force proportioned to the speed of travel of the planter, means for intermittently delivering a seed to each valve, and means operating intermittently to simultaneously actuate both pairs of valves to discharge four seeds in predetermined spaced relation on the ground.

9. In a check row seed planter, the combination of means for removing a strip of soil of sufficient depth to render the underlying soil substantially free from weed growth, and means for intermittently depositing four seeds in definite spaced relation at the corners of a quadrangle in the weed-freed soil, thereby forming a row of hills of four seeds each adapted for cross cultivation.

In testimony whereof I affix my signature, in the presence of two witnesses.

RAY STEWART GEHR.

Witnesses:
   FRED J. WHITCOMB,
   CHARLES H. TOWER.